W. B. GABEL.
Horse Hay-Fork.
No. 72,282. Patented Dec. 17, 1867.
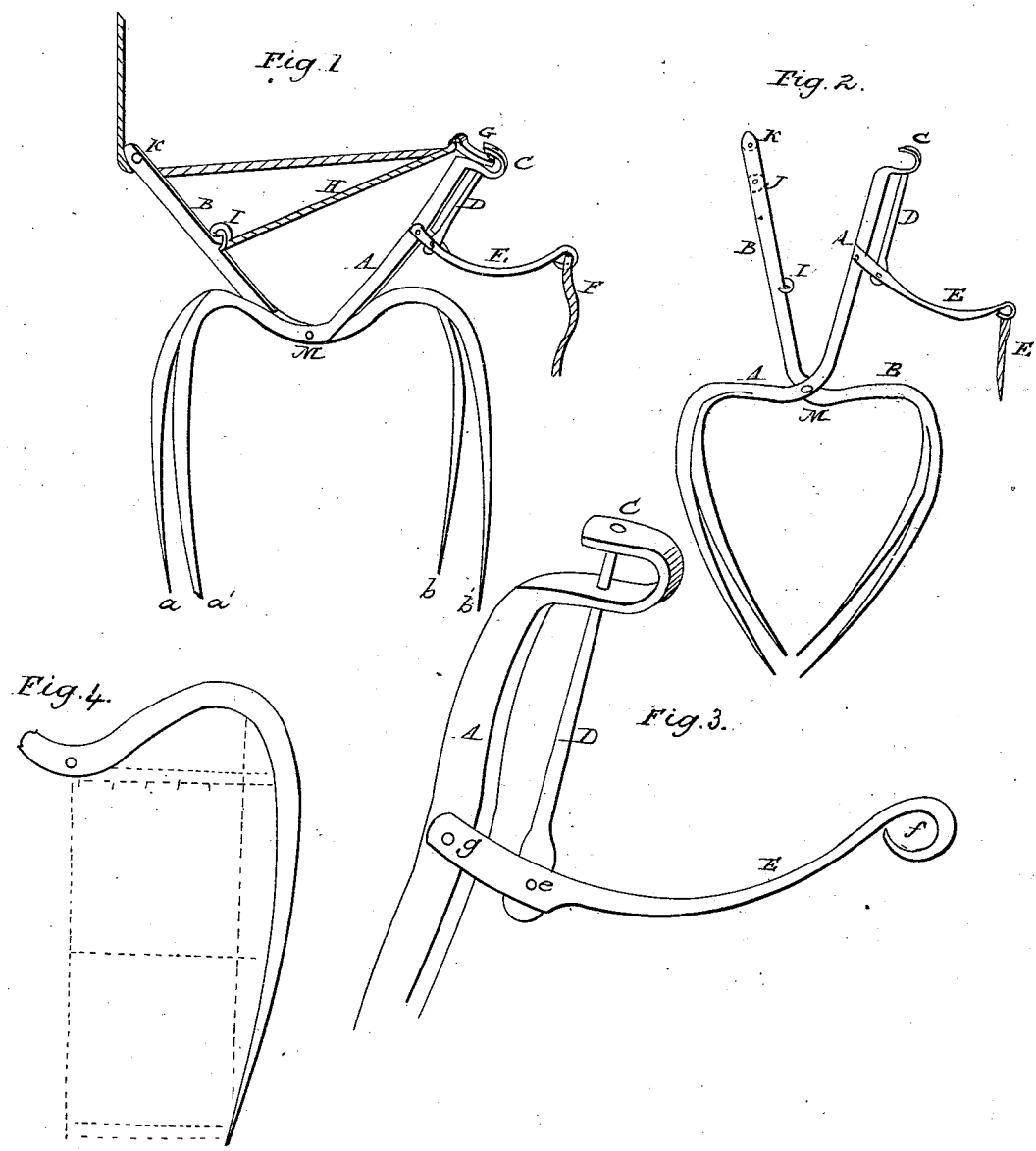

United States Patent Office.

WILLIAM B. GABEL, OF EAST COCALICO TOWNSHIP, PENNSYLVANIA.

*Letters Patent No. 72,282, dated December 17, 1867.*

---

IMPROVEMENT IN HORSE HAY-FORKS.

---

*The Schedule referred to in these Letters Patent and making part of the same.*

---

TO ALL WHOM IT MAY CONCERN:

Be it known that I, WILLIAM B. GABEL, of East Cocalico township, in the county of Lancaster, in the State of Pennsylvania, have invented a new and useful Improvement on Hay-Forks; and I do hereby declare that the following is a full and exact description of the construction and operation of the same, reference being had to the accompanying drawings, making a part of this specification, in which—

Figure 1 shows my arrangement of the parts when open.

Figure 2, the same when closed.

Figure 3, an enlarged view of the lever and bolt.

Figure 4, the curve of the tine shown.

The nature of my invention consists in the construction of the united forks, giving them the proper curve, as also in the manner of connecting the bolt (that holds the link of the hoisting-rope) with the lever-arm for disengaging the link.

To enable others skilled in the art to make and use my invention, I will proceed to describe its construction and operation.

This fork, in common with many others, consists of two portions, A and B, each arm divided into two prongs, $a\ a'$ and $b\ b'$, so curved that when open the tines or prongs stand nearly vertical, as shown by fig. 1. This bend, in proportion to the length, is best calculated to enter the hay freely, requiring no force. The hoisting-rope, H, has a knot on its end to prevent it from slipping through the eye or ring, I, on the arm B, from whence it extends through, or is connected to, a link, G, or its equivalent. This link connects the arms A and B by means of the rope, when said link is lodged in the flat terminal hook C of the arm A, and held by a vertical bolt, D, which enters through holes in the hook C for said purpose; the rope being continued from the link G, and carried under a pulley, K, in the upper portion of the arm B. The hoisting is performed in the ordinary manner. This bolt D is attached by a pivot to the lever-arm E, connected to the fork-arm A, as shown by fig. 3 more clearly. A spring may also be attached to throw and keep the bolt up, combined with the lever-arm E.

The arrangement for retaining the link in the hook C is by the bolt D, and its withdrawal by the lever E, to which a light cord, F, is attached. A slight pull on said cord will draw the bolt, and the tension on the cord, by the compressed load grasped between the prongs, will release the hay or material grasped so quickly and with such ease and certainty, that, considering the whole fork collectively, it has all the requisite qualities required for the greatest efficiency, and by means of the additional ring, I, on the prong-handle B for the rope H to pass through, a grasping force of greater power is obtained than when simply passed from the top of one arm to the other.

I am aware that numerous arrangements and combinations are patented for elevating hay. In each there is a specified peculiarity claimed, such, for instance, as in Mr. Garrett's patent of August 29, 1865. He unites cross-tines by central bars, and claims the arms curved laterally for the purpose of dispensing with the wooden head, &c., using a lever, latch, and pulley in common with others variously fashioned and applied. I offer a different arrangement, and one that is well calculated to work with ease and satisfaction, and to perform its duty, as it was fairly tested on the field last season.

What I claim as my invention, and desire to secure by Letters Patent, is—

The vertical bolt D, entering the eyes of a flattened hook, C, which terminates a single arm, A, forked at the other end, and connected to a similar forked arm, B, by a central rivet, all arranged as above described, and in combination with the lever E, ring I, and one or two pulleys, K J, all arranged and operating in the manner and for the purpose specified.

WILLIAM B. GABEL.

Witnesses:
 WM. B. WILEY,
 JACOB STAUFFER.